W. S. HARLEY.
FOOTBOARD ATTACHMENT FOR MOTOR CYCLES.
APPLICATION FILED MAY 22, 1914.
1,116,420.
Patented Nov. 10, 1914.
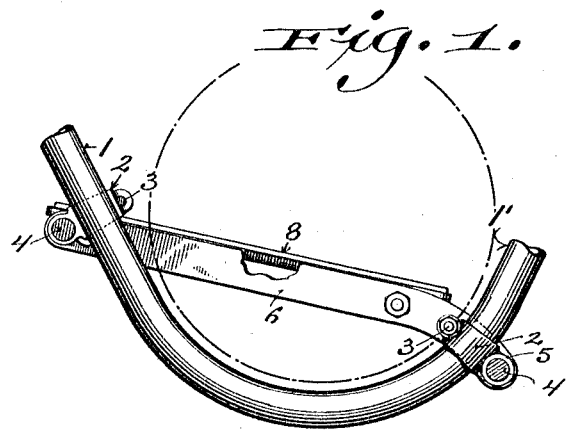
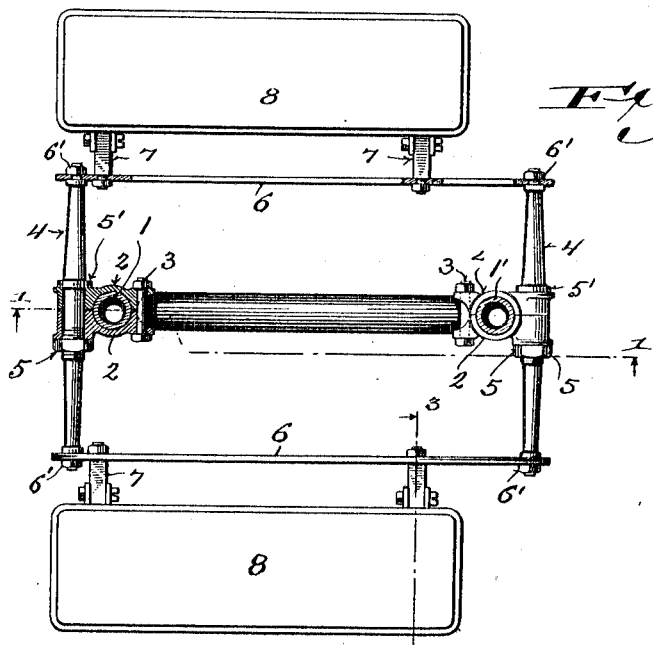
Witnesses:
Inventor:
William S. Harley
By Olyphant & Young
Attorneys.

UNITED STATES PATENT OFFICE.

WILLIAM S. HARLEY, OF MILWAUKEE, WISCONSIN.

FOOTBOARD ATTACHMENT FOR MOTOR-CYCLES.

1,116,420.

Specification of Letters Patent.   Patented Nov. 10, 1914.

Application filed May 22, 1914.   Serial No. 840,159.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Footboard Attachments for Motor-Cycles; and I do hereby declare that the following is a full, clear, and exact description thereof.

My invention has for its object to provide a simple, economical and effective footboard attachment for motorcycles, the same being so constructed and arranged that it may be readily attached to the upturned stretches of the loop member of a motorcycle frame, whereby the motor and associated mechanism is cleared.

A further object of my invention is to provide a construction of frame for carrying the foot-boards so arranged that it can be knocked down and shipped in a compact form and thereafter can be adjusted to the motorcycle frame by those unskilled in the art.

With the above objects in view the invention consists in certain peculiarities of construction and combination of parts as set forth hereinafter with reference to the accompanying drawings and subsequently claimed.

In the drawings Figure 1 represents the loop member of a motorcycle frame having attached thereto a foot-rest frame embodying the features of my invention, the same being in section, as indicated by line 1—1 of Fig. 2; Fig. 2, a plan view of the foot-rest mechanism with the motorcycle frame member in section, and Fig. 3, a detailed cross-section of the foot-board showing the means of attaching the same to the frame, the section being indicated by line 3—3 of Fig. 2.

Referring by characters to the drawings, 1, 1', represent the upward stretches of the loop member of a motorcycle frame, to each of which stretches a separable pair of clipped members 2 are fitted, being clamped thereto by clip bolts 3. The shanks of the clip members are apertured for the reception of transversely disposed bars 4, which bars and clip members are clamped together by binding nuts 5 that are mounted upon threaded sections of said bars, the nuts being arranged to force the clip members against shoulders 5' of the aforesaid bars. By this arrangement of the clips in connection with the bars, it will be observed that said clips may be oscillated upon the bars to adjust themselves to the angles of the stretches 1 and 1' of the motorcycle loop member. The ends of the transverse bars 4 have fitted thereto straps 6, which straps are secured by bolts 6' that are in threaded union with the ends of the bars. Thus the straps and bars together constitute a rectangular foot-board carrying frame. Each bar 6 is provided with a removable pair of ears 7, to which ears are pivoted foot-boards 8, the said foot-boards being arranged parallel with the straps and adapted to fold inwardly when not in use and, when extended, the foot-boards are supported in their working positions by lugs 7' that project from the ears 7, upon which lugs the foot-boards rest.

From the foregoing it is manifest that the various members constituting the footboard mechanism can be assembled and knocked down readily and that, when the frame is connected up, as shown in Fig. 2, it can readily be attached to the upturned stretches 1 and 1' of the loop member of a motorcycle, into the throat of which loop member the motor or engine is ordinarily suspended, as indicated by dotted lines in Fig. 1.

While I have shown and described the clips as formed in two parts and oscillatory with relation to the transverse frame-bars 4, it is obvious that the said clips may be formed from a single piece with jaws for receiving the motorcycle frame member, in which instance the jaws would necessarily be spaced apart a width that corresponds to the diameter of the motorcycle tube or frame member and these jaws would be connected by clip-bolts, as shown.

I claim:

An article of manufacture of the character described comprising a pair of strap members, a pair of bars in detachable union with the ends of the strap members, apertured ears extending from the straps, a footboard in pivotal union with the ears of each strap, and clip members fitted to the bars for clamping engagement with the upturned stretches of a motorcycle frame member.

In testimony that I claim the foregoing I have hereunto set my hand at Milwaukee in the county of Milwaukee and State of Wisconsin in the presence of two witnesses.

WILLIAM S. HARLEY.

Witnesses:
 WALTER DAVIDSON,
 J. J. BALSOM.